US006542152B2

(12) United States Patent
Lu

(10) Patent No.: US 6,542,152 B2
(45) Date of Patent: Apr. 1, 2003

(54) METHOD AND APPARATUS FOR CULLING

(75) Inventor: Chung-Yen Lu, Taipei (TW)

(73) Assignee: Silicon Integrated Systems Corp., Hsin-chu (TW)

( * ) Notice: Subject to any disclaimer, the term of this patent is extended or adjusted under 35 U.S.C. 154(b) by 232 days.

(21) Appl. No.: 09/764,067

(22) Filed: Jan. 19, 2001

(65) Prior Publication Data
US 2002/0135576 A1 Sep. 26, 2002

(51) Int. Cl.[7] .................................................. G06T 15/40
(52) U.S. Cl. ....................................................... 345/421
(58) Field of Search ............................... 345/421, 423, 345/428, 505, 519, 520, 522

(56) References Cited
U.S. PATENT DOCUMENTS 5,319,447 A * 6/1994 Garino et al. ............... 348/708
5,784,047 A * 7/1998 Cahill et al. ................ 345/660
6,377,265 B1 * 4/2002 Bong ........................... 345/505

* cited by examiner

Primary Examiner—Mark Zimmerman
Assistant Examiner—Enrique L Santiago
(74) Attorney, Agent, or Firm—Birch, Stewart, Kolasch & Birch, LLP

(57) ABSTRACT

The present invention is to provide a culling method, used in the computer graphics systems, for determining the visibility of two adjacent polygons of a polyhedron at the same time. It also provides a culling apparatus, which uses the method to execute the culling test. The culling apparatus comprises one multiplier, three multiplexers, two registers, one adder/subtractor, and a controller with a set of instructions to control the whole procedure.

3 Claims, 2 Drawing Sheets

METHOD AND APPARATUS FOR CULLING

BACKGROUND OF THE INVENTION

A. Field of the Invention

This invention relates generally to a method and an apparatus for culling and, more particularly, to a method and an apparatus for accelerating culling tests in computer graphics systems.

B. Description of the Related Art

A computer graphics system is commonly used to display three-dimensional representations of an object on a two-dimensional display screen. In a typical computer graphics system, an object to be rendered is divided into a plurality of graphics primitives. The graphics primitives are basic components of a graphics picture and may be defined by geometries of a point, line, vector, or polygon, such as a triangle. The graphics primitives are fed through a graphics pipeline where various types of processing occur and are then rendered on a display.

Culling, also called backface elimination, is an operation that compares the orientation of polygons in a polyhedron with the viewpoint or center of projection, and removes those polygons that cannot be seen. On average, half of the polygons in a polyhedron are backfacing and the advantage of this process is by using a simple test to remove these polygons. The test for visibility is straightforward and is best carried out in view space. We calculate the outward normal of a polygon and examine the sign of the dot product of this normal vector and the vector from the center of projection, as illustrated in FIG. 1.

As shown in FIG. 1 are the outward normal vector of a polygon $N_p$, and the 'line of sight' vector N from the center of the face to the viewpoint. Based on these two vectors, the visibility of a polygon is defined as:

$$\text{Visibility} = N_p \cdot N > 0$$

Where:

$N_p$ is the polygon normal

N is the 'line of sight' vector

In order to determine whether a polygon is visible on a two-dimensional flat screen, select three points $V_1$, $V_2$, and $V_3$ from the polygon where the $V_1$ is the center point, $V_2$ and $V_3$ are any points on the surface which satisfy the condition that $V_1$, $V_2$, and $V_3$ are not on the same line, and ($V_1$, $V_2$, $V_3$) is distributed counterclockwise.

From the visibility test:

$$\text{Visibility} = N_p \cdot N[(V_2-V_1) \times (V_3-V_1)] \cdot (V_1-V_0) > 0$$

Where:

$V_0$ is the viewpoint (0, 0, 0), and $V_1$, $V_2$, and $V_3$ are the selected vertices $(x_1, y_1, z_1)$, $(x_2, y_2, z_2)$, and $(x_3, y_3, z_3)$ for a triangle.

The calculation for the visibility test is:

$$\text{Visibility} = \begin{vmatrix} x_1 & y_1 & z_1 \\ x_2 & y_2 & z_2 \\ x_3 & y_3 & z_3 \end{vmatrix} > 0$$

Although the equation for the culling test may seem to be relatively simple and straightforward, it takes twelve multiplication processes and five addition/subtraction processes to complete the whole calculation to test the visibility for one triangle. For two triangles, hence, it takes 24 multiplications and 10 addition/subtractions. Not only is the calculation process unwieldy but also time-consuming.

SUMMARY OF THE INVENTION

In view of these problems, the object of the present invention is to provide a method and an apparatus for use in computer graphics system which can render and display graphics primitives faster.

In one aspect of the present invention, a method is provided for determining, at the same time, whether two adjacent polygons of a polyhedron are visible on a 2-dimensional visual display unit. The test can be done more easily and rapidly. It lends itself to rapid real-time culling and eliminates surfaces certain to be not visible at the observer's viewpoint.

Another aspect of the present invention is to provide an apparatus to execute the culling test described above. The culling apparatus comprises one multiplier, three multiplexers, two registers, one adder/subtractor, and a computer program with a set of commands controlling the flow and process of data. The instruction commands may be installed in ROM to be used in the computer graphic systems in order to compute and control all data inputs and outputs of culling test.

The benefits of this invention will become evident as the present invention is described more fully below.

TABLE 1 is a program for the culling test of two adjacent triangles according to one aspect of the present invention.

TABLE 2 is a step by step algorithm for the program shown in TABLE 1.

TABLE 3 is a program for the culling test which uses two multipliers and one adder according to one aspect of the present invention.

DETAILED DESCRIPTION OF PREFERRED EMBODIMENTS

Figure 1:
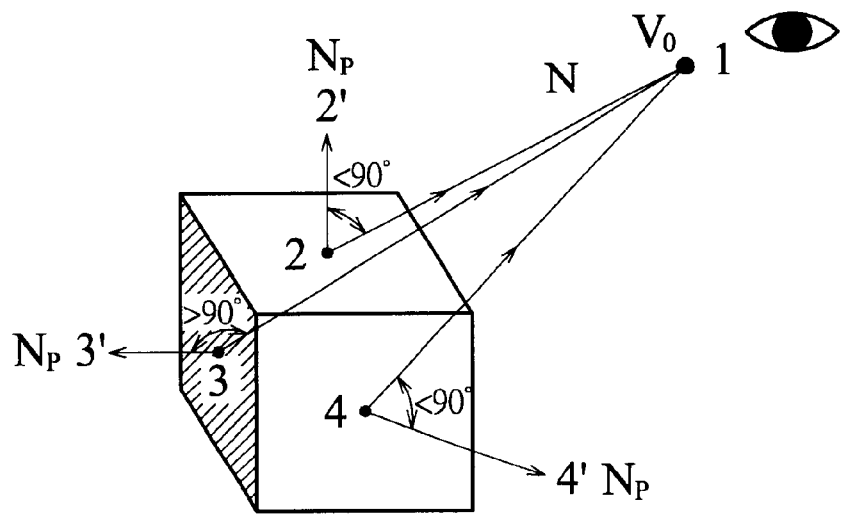
FIG. 1 is a geometric description of the culling operation.
Figure 2:
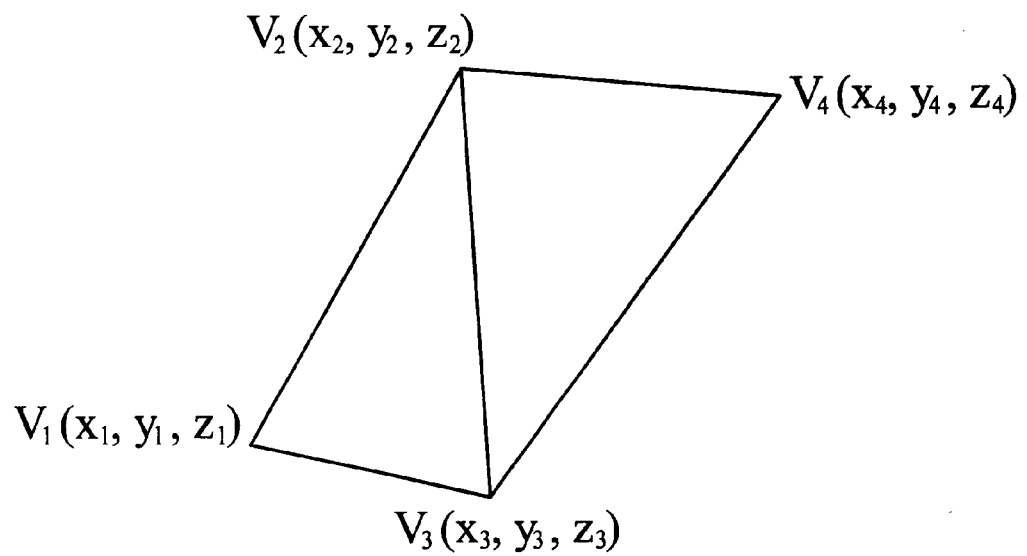
FIG. 2 illustrates two adjacent triangles, according to one aspect of the present invention, sharing two vertices and one common side.

As shown in FIG. 2, the two adjacent triangles, assumed not to be on the same plane of a 3-dimensional object, share two vertices. The present invention takes two adjacent triangles to perform the culling test synchronously, in order to save computation time and costs. If the selected triangles $\Delta_{123}$ and $\Delta_{423}$ of two adjacent polygons comprise four vertices $\{V_1, V_2, V_3, V_4\}$, the culling test of the present invention for $\Delta 123$ and $\Delta 423$ produce two outcomes. The calculation process is described below.

$$\Delta_{123} = \begin{vmatrix} x_1 & y_1 & z_1 \\ x_2 & y_2 & z_2 \\ x_3 & y_3 & z_3 \end{vmatrix} = x_1 \begin{vmatrix} y_2 & z_2 \\ y_3 & z_3 \end{vmatrix} + y_1 \begin{vmatrix} z_2 & x_2 \\ z_3 & x_3 \end{vmatrix} + z_1 \begin{vmatrix} x_2 & y_2 \\ x_3 & y_3 \end{vmatrix}$$

-continued $$\Delta_{423} = \begin{vmatrix} x_4 & y_4 & z_4 \\ x_2 & y_2 & z_2 \\ x_3 & y_3 & z_3 \end{vmatrix} = x_4 \begin{vmatrix} y_2 & z_2 \\ y_3 & z_3 \end{vmatrix} + y_4 \begin{vmatrix} z_2 & x_2 \\ z_3 & x_3 \end{vmatrix} + z_4 \begin{vmatrix} x_2 & y_2 \\ x_3 & y_3 \end{vmatrix}$$

From the two equations above, Δ123 and Δ423 have three common terms:

$$\begin{vmatrix} y_2 & z_2 \\ y_3 & z_3 \end{vmatrix}, \begin{vmatrix} z_2 & x_2 \\ z_3 & x_3 \end{vmatrix}, \text{ and } \begin{vmatrix} x_2 & y_2 \\ x_3 & y_3 \end{vmatrix},$$

denoted by $S_5$, $S_7$ and $S_9$ respectively. By calculating these common terms before generating two test outcomes for the adjacent triangles, the present invention utilizes the present method and saves the computation time of culling test.

With reference to FIG. 2, the coordinates of the common vertices for $\Delta_{123}$ and $\Delta_{423}$ are $V_2(x_2, y_2, z_2)$ and $V_3(x_3, y_3, z_3)$, and side $\overline{V_2V_3}$ is the common side for both triangles. Calculations for all embodiments described below are based on these coordinators as shown in FIG. 2.

Figure 3:
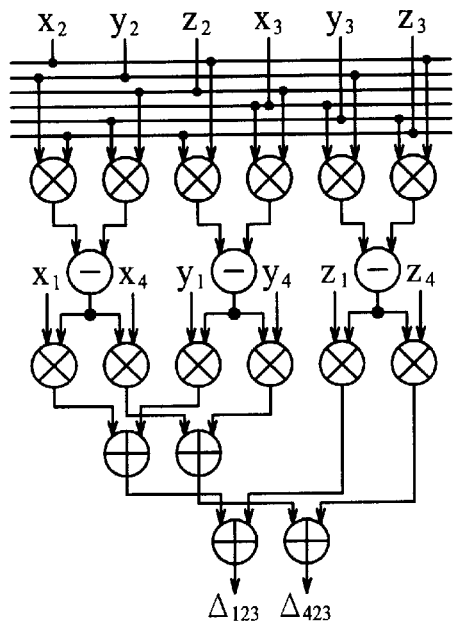
FIG. 3 is a schematic diagram illustrating the computation of culling tests for two adjacent triangles.

FIG. 3 is one embodiment of the present invention. The architecture of the embodiment could provide two test outcomes simultaneously. The circuit is designed to compute common terms first then generate the outcomes.

From the calculation algorithms, the first step of the culling test is to compute the 6 terms: $(y_2*z_3)$, $(z_2*y_3)$, $(z_2*x_3)$, $(x_2*z_3)$, $(x_2*y_3)$, and $(y_2*x_3)$, and results are denoted by $P_1$, $P_2$, $P_3$, $P_4$, $P_5$, and $P_6$ respectively.

Secondly, compute the result of the 3 common terms $(P_1-P_2)$, $(P_3-P_4)$, and $(P_5-P_6)$, results are denoted by $S_5$, $S_7$, and $S_9$ respectively.

Thirdly, bring in the third vertex of each triangle to the computation. Results for $(x_1*S_5)$, $(x_4*S_5)$, $(y_1*S_7)$, $(y_4*S_7)$, $(z_1*S_9)$ and $(z_4*S_9)$ are denoted by $P_8$, $P_9$, $P_{10}$, $P_{11}$, $P_{12}$ and $P_{13}$ respectively.

In mathematical expressions:

$$\Delta_{123} = x_1 \begin{vmatrix} y_2 & z_2 \\ y_3 & z_3 \end{vmatrix} + y_1 \begin{vmatrix} z_2 & x_2 \\ z_3 & x_3 \end{vmatrix} + z_1 \begin{vmatrix} x_2 & y_2 \\ x_3 & y_3 \end{vmatrix}$$

$$\Delta_{123} = x_1(y_2z_3 - z_2y_3) + y_1(z_2x_3 - x_2z_3) + z_1(x_2y_3 - y_2x_3)$$
$$= x_1(P_1 - P_2) + y_1(P_3 - P_4) + z_1(P_5 - P_6)$$
$$= x_1*S_5 + y_1*S_7 + z_1*S_9$$
$$= P_8 + P_{10} + P_{12}$$

$$\Delta_{423} = x_4 \begin{vmatrix} y_2 & z_2 \\ y_3 & z_3 \end{vmatrix} + y_4 \begin{vmatrix} z_2 & x_2 \\ z_3 & x_3 \end{vmatrix} + z_4 \begin{vmatrix} x_2 & y_2 \\ x_3 & y_3 \end{vmatrix}$$

$$\Delta_{423} = x_4(y_2z_3 - z_2y_3) + y_4(z_2x_3 - x_2z_3) + z_4(x_2y_3 - y_2x_3)$$
$$= x_4(P_1 - P_2) + y_4(P_3 - P_4) + z_4(P_5 - P_6)$$
$$= x_4*S_5 + y_4*S_7 + z_4*S_9$$
$$= P_9 + P_{11} + P_{13}$$

Because computer can execute only one task at a time, it adds up two terms of the equations first, before adding the third ones to obtain the culling outcome. Thus:

$$\Delta_{123} = P_8 + P_{10} + P_{12}$$
$$= (P_8 + P_{10}) + P_{12}$$
$$= S_{13} + P_{12}$$

$$\Delta_{423} = P_9 + P_{11} + P_{13}$$
$$= (P_9 + P_{11}) + P_{13}$$
$$= S_{14} + P_{13}$$

If the culling test for $\Delta_{123}=S_{13}+P_{12}$ is greater than zero, the polygon where $\Delta_{123}$ is selected from is visible; on the other hand, if the test outcome for $\Delta_{123}$ is equal to or less than zero, the polygon is not visible. Likewise, if the test outcome for $\Delta_{423}$ is greater than zero, the polygon is visible; if the test outcome is not equal to zero, the polygon is not visible.

Suppose the pipeline depths of all adders and multipliers used are equal to 3. With enough number of adders and multipliers, the five calculation steps of culling test for both $\Delta_{123}$ and $\Delta_{423}$, as shown in FIG. 3, can be completed within 15 cycles to obtain the outcomes.

Figure 4:
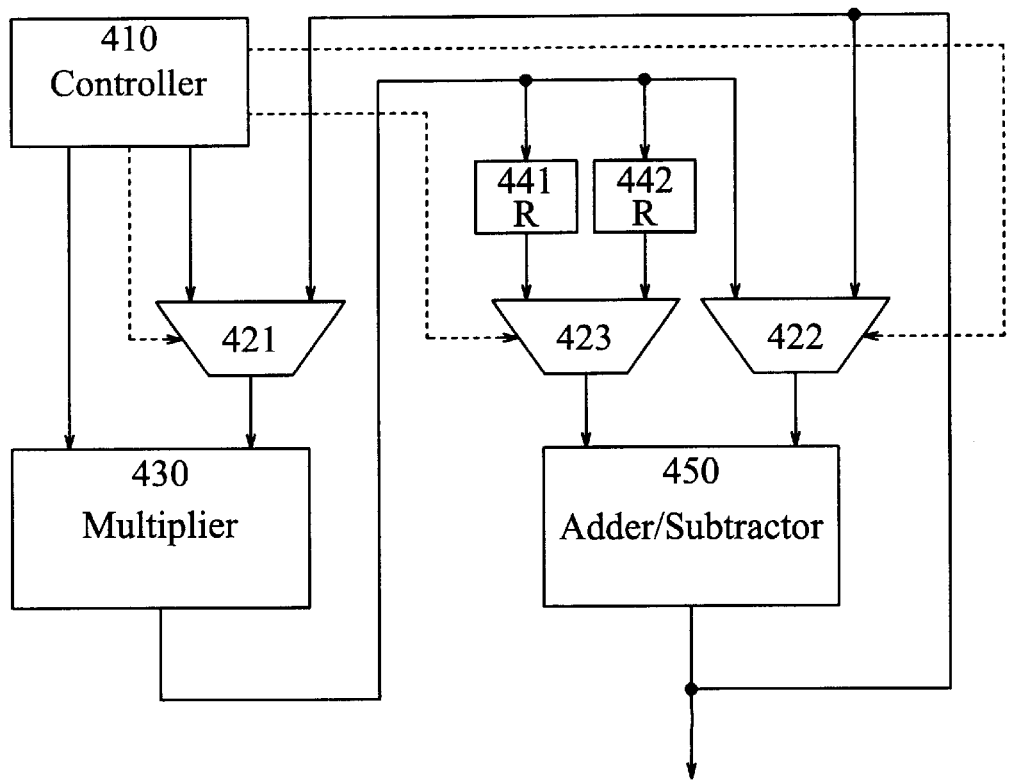
FIG. 4 is a block diagram of the culling test circuit of one preferred embodiment of the present invention.

Shown in FIG. 4 is an aspect of the culling test circuit for the present invention. In this embodiment, a controller 410 is used to control the culling test circuit. The controller 410 controls the data input order to the first multiplexer 421 and the multiplier 430, and data selections of the three multiplexers 421, 422, and 423. The culling test circuit consists of one multiplier, one adder/subtractor, two registers, and three multiplexers. The multiplier 430 receives two input data at beginning of each cycle for the computation, and the adder/subtractor 450 generates one output data at the end of each cycle. The whole computation process takes about 20 cycles to test the visibility of two adjacent planes of a 3-dimensional object.

Specifically speaking, the first multiplexer 421 has two receiving terminals where the first receiving terminal receives first primitive data from the system controller 410 and is sent to the second receiving terminal of the multiplier 430. The multiplier 430 has two receiving terminals where the first input terminal receives second primitive data from the system controller 410, and the second input terminal receives the output signal of the first multiplexer 421. The first register (R) 441 is used to store data received from the multiplier 430. The second register is used to store data received from said multiplier 430 as well. The second multiplexer 422 has two receiving terminals where the first terminal receives signals from the multiplier 430 and the third multiplexer 423 also has two receiving terminals receiving signals from the first and the second registers 441 and 442. The adder receives two primitives data from the second and third multiplexer 422 and 423, adds to or subtracts from the third multiplexer 423 the primitive data values stored in the second multiplexer 422. The outcome is then feedback to the first and the second multiplexers 421 and 422 until the whole procedure is completed.

Suppose the pipeline depths for both the multiplier 430 and the adder/subtractor 450 are 3, it means that if a computation starts at cycle K, the result of that computation will be obtained at cycle (K+3). One of the programs for the circuit to compute culling test is illustrated in TABLE 1. Take TABLE 1 as an example. A statement "$P_1=y_2*z_3$" at cycle 1 means that the computation of $y_2$ multiplies by $z_3$ is commenced at cycle 1. The controller 410 starts to feed the first primitive data $z_3$ to the first multiplexer 421 and the second primitive data $y_2$ to the multiplier 430. The multiplier then calculates the product of $y_2$ and $z_3$, and its result $P_1$ is obtained at cycle 4. The product $P_1$ is then stored temporarily at a memory medium, the first register 441. Meanwhile, the computation of $P_2=y_3*z_2$ starts at cycle 2 in the same manner and obtains the result $P_2$ at cycle 5. The result is then sent to the second multiplexer 422. After obtaining the values of $P_1$ and $P_2$ at the fifth cycle, the computation $P_1-P_2$, denoted by $S_5$, can then be commenced and the result is output to a multiplexer, the first and second multiplexer 421 and 422. The rest can be explained by analogy. TABLE 2 is the detailed operation process that is induced from the FIG. 4 and TABLE 1.

Let $S_5$, $S_7$, and $S_9$ denote the common terms:

$$\begin{vmatrix} y_2 & z_2 \\ y_3 & z_3 \end{vmatrix}, \begin{vmatrix} z_2 & x_3 \\ z_3 & x_3 \end{vmatrix}$$

and $$\begin{vmatrix} x_2 & y_2 \\ x_3 & y_3 \end{vmatrix}.$$

Take the calculation for $S_5$ as an example:

$$S_5 = \begin{vmatrix} y_2 & z_2 \\ y_3 & z_3 \end{vmatrix}$$
$$= y_2 z_3 - z_2 y_3$$
$$= P_1 - P_2$$

In accordance with FIG. 4 and TABLE 1, the value of $P_1$ is available at cycle 4 and is stored in the first register 441 and the value of $P_2$ is obtained at cycle 5 and output to the second multiplexer 422. The subtraction of $P_2$ from $P_1$ starts at cycle 5 and the result $S_5$ is obtained at cycle 8. Likewise, the calculations for $S_7$ and $S_9$ start at cycle 7 and 9, and the results are obtained at cycle 10 and 12 respectively.

After obtaining the results for $S_5$, $S_7$, and $S_9$, the system then begins the computation of $(x_1 * S_5)$ at cycle 8, $(y_1 * S_7)$ at cycle 10, and $(z_1 * S_9)$ at cycle 12. The culling test for $\Delta_{123}$ is the sum of these 3 terms, denoted by $P_8$, $P_{10}$ and $P_{12}$. The final outcome for $\Delta_{123}$ is then obtained at cycle 19. The test outcome for triangle $\Delta_{243}$ is obtained at cycle 20 in the same manner.

The controller 410 controls the whole process. It may be pre-installed in the read only memory to control the flow of data and the data selection of the three multiplexers 421, 422, and 423.

At the present time, the culling tests for any planes on a 3-dimensional object are computed individually. It takes 35 cycles to complete culling tests for two different planes of a 3-dimensional object. However, according to this invention, the total time required for two culling tests is 20 cycles. If more calculation devices are provided, for example, more multipliers or adders/subtractors, the total calculation time can be further reduced. For example, if two multipliers and one adder/subtractor are provided, the outcomes of two culling tests can be obtained at cycle 18. The detailed computation procedures are shown in TABLE 3.

While the present invention has been shown and described with reference to a preferred embodiment thereof, and in terms of the illustrative drawings and algorithmic tables, it should not be considered as limited thereby. Various possible modifications, omissions, and alterations could be conceived of by one skilled in the art to the form and the content of any particular embodiment, without departing from the scope of the present invention.

TABLE 1

| T | Multiplier | Adder/Subtractor |
|---|---|---|
| 1. | $P_1 = y_2 * z_3$ | |
| 2. | $P_2 = y_3 * z_2$ | |
| 3. | $P_3 = z_2 * x_3$ | |
| 4. | $P_4 = z_3 * x_2$ | |
| 5. | $P_5 = x_2 * y_3$ | $S_5 = P_1 - P_2$ |
| 6. | $P_6 = x_3 * y_2$ | |
| 7. | | $S_7 = P_3 - P_4$ |
| 8. | $P_8 = x_1 * S_5$ | |
| 9. | $P_9 = x_4 * S_5$ | $S_9 = P_5 - P_6$ |
| 10. | $P_{10} = y_1 * S_7$ | |
| 11. | $P_{11} = y_4 * S_7$ | |
| 12. | $P_{12} = z_1 * S_9$ | |
| 13. | $P_{13} = z_4 * S_9$ | $S_{13} = P_8 + P_{10}$ |
| 14. | | $S_{14} = P_9 + P_{11}$ |
| 15. | | |
| 16. | | $\Delta_{123} = P_{12} + S_{13}$ |
| 17. | | $\Delta_{423} = P_{13} + S_{14}$ |
| 18. | | |
| 19. | | |
| 20. | | |

TABLE 2

| T | Input 1 | Input 2 1st Multiplexer | Mulitplier (x) | Output (x) | 1st Reg. | 2nd Reg. | 3rd Multiplexer | 2nd Multiplexer | +/- | Output (+/-) |
|---|---|---|---|---|---|---|---|---|---|---|
| 1. | $y_2$ | $z_3$ : — | $P_1 = y_2 * z_3$ | | | | | | | |
| 2. | $y_3$ | $z_3$ : — | $P_2 = y_3 * z_2$ | | | | | | | |
| 3. | $y_2$ | $x_3$ : — | $P_3 = z_2 * x_3$ | | | | | | | |
| 4. | $z_3$ | $x_3$ : — | $P_4 = z_3 * x_2$ | $P_1$ | $P_1$ | | | | | |
| 5. | $x_2$ | $y_3$ : — | $P_5 = x_2 * y_3$ | $P_2$ | $P_1$ | | $P_1$ : — | $P_2$ : — | $S_5 = P_1 - P_2$ | |
| 6. | $x_3$ | $y_2$ : — | $P_6 = x_3 * y_2$ | $P_3$ | $P_3$ | | | — : — | | |
| 7. | | | | $P_4$ | $P_3$ | | $P_3$ : — | $P_4$ : — | $S_7 = P_3 - P_4$ | |
| 8. | $x_1$ | — : $S_5$ | $P_8 = x_1 * S_5$ | $P_5$ | $P_5$ | | | — : $S_5$ | | $S_5$ |
| 9. | $x_4$ | — : $S_5$ | $P_9 = x_4 * S_5$ | $P_6$ | $P_5$ | | $P_5$ : — | $P_6$ : — | $S_9 = P_5 - P_6$ | |
| 10. | $y_1$ | — : $S_7$ | $P_{10} = y_1 * S_7$ | | | | | $P_6$ : $S_7$ | | $S_7$ |
| 11. | $y_4$ | — : $S_7$ | $P_{11} = y_4 * S_7$ | $P_8$ | $P_8$ | | | $P_6$ : — | | |
| 12. | | $S_7$ : $S_9$ | $P_{12} = z_1 * S_9$ | $P_9$ | $P_8$ | $P_9$ | — : $S_9$ | | | |
| 13. | | $S_7$ : $S_9$ | $P_{13} = z_4 * S_9$ | $P_{10}$ | $P_8$ | $P_9$ | $P_d$ : — | — : $P_{10}$ | $S_{13} = P_8 + P_{10}$ | |
| 14. | | $S_7$ : $S_9$ | | $P_{11}$ | $P_{11}$ | $P_9$ | | — : $P_9$ | $P_{11}$ : — | $S_{14} = P_9 + P_{11}$ | |
| 15. | | $S_7$ : $S_9$ | | $P_{12}$ | $P_{12}$ | | | | — : $P_{10}$ | |
| 16. | | $S_{13}$ : $S_9$ | | $P_{13}$ | $P_{13}$ | | $P_{12}$ : — | —: $S_{13}$ | $\Delta_{123} = P_{12} + S_{13}$ | $S_{13}$ |
| 17. | | $S_{13}$ : $S_{14}$ | | | $P_{13}$ | | $P_{13}$ : — | —: $S_{14}$ | $\Delta_{423} = P_{13} + S_{14}$ | $S_{14}$ |
| 18. | | | | | | | | | | |
| 19. | | | | | | | | | | $\Delta_{123}$ |
| 20. | | | | | | | | | | $\Delta_{423}$ |

TABLE 3

| T | Multiplier 1 | Multiplier 2 | +/− |
|---|---|---|---|
| 1. | $P_1 = y_2 * z_3$ | $P_2 = y_3 * z_2$ | |
| 2. | $P_3 = z_2 * x_3$ | $P_4 = z_3 * x_2$ | |
| 3. | $P_5 = x_2 * y_3$ | $P_6 = x_3 * y_2$ | |
| 4. | | | $S_5 = P_1 - P_2$ |
| 5. | | | $S_7 = P_3 - P_4$ |
| 6. | | | $S_9 = P_5 - P_6$ |
| 7. | $P_8 = x_1 * S_5$ | $P_9 = x_4 * S_5$ | |
| 8. | $P_{10} = y_1 * S_7$ | $P_{11} = y_4 * S_7$ | |
| 9. | $P_{12} = z_1 * S_9$ | $P_{13} = z_4 * S_9$ | |
| 10. | | | |
| 11. | | | $S_{13} = P_8 + P_{10}$ |
| 12. | | | $S_{14} = P_9 + P_{11}$ |
| 13. | | | |
| 14. | | | $\Delta_{123} = P_{12} + S_{13}$ |
| 15. | | | $\Delta_{423} = P_{13} + S_{14}$ |
| 16. | | | |
| 17. | | | |
| 18. | | | |

What is claimed is:

1. A culling method, used in a computer graphics system, for determining the visibility of two planes at the same time, comprising the steps of:

selecting 4 points from the surface of the 3-dimensional object to form two triangles, $\Delta_{123}$ and $\Delta_{423}$, sharing one adjacent side and two common vertices;

determining the coordinates of the selected four vertices for the two triangles sharing vertices $V_2$ and $V_3$:

assigning three vertices $V_1(x_1, y_1, z_1)$, $V_2(x_2, y_2, z_2)$, and $V_3(x_3, y_3, z_3)$ for the first triangle $\Delta_{123}$;

assigning three vertices $V_4(x_4, y_4, z_4)$, $V_2(x_2, y_2, z_2)$, and $V_3(x_3, y_3, z_3)$ for the second triangle $\Delta_{423}$;

computing the three common terms $(y_2z_3 - z_2y_3)$, $(z_2x_3 - x_2z_3)$, and $(x_2y_3 - y_2x_3)$;

computing the culling equations $x_1(y_2z_3 - z_2y_3) + y_1(z_2x_3 - x_2z_3) + z_1(x_2y_3 - y_2x_3)$ and $x_4(y_2z_3 - z_2y_3) + y_4(z_2x_3 - x_2z_3) + z_4(x_2y_3 - y_2x_3)$ for $\Delta_{123}$ and $\Delta_{423}$, respectively; and determining the visibility of the two triangles according to the signs of the two culling equation:

if $\Delta > 0$, the plane tested being visible;

if $\Delta \leq 0$, the plane tested being invisible.

2. A culling apparatus for use in a graphics computer to determine the visibility of the two triangles, comprising:

a first multiplexer with a first input terminal and a second input terminal, the first input terminal receiving a first primitive data from the system;

a multiplier with a first input terminal and a second input terminal, the first input terminal receiving a second primitive data from the system and the second input terminal receiving the output signal of said first multiplexer;

a first register for storing data received from said multiplier;

a second register for storing data received from said multiplier;

a second multiplexer with a first input terminal and a second input terminal, the first input terminal receiving signals from the multiplier;

a third multiplexer with two input terminals for receiving signals from said first and second registers;

an adder for adding the data from said second multiplexer and said third multiplexer and output a data;

a controller installed in ROM with a set of instruction commands to be used in the computer graphic systems to compute and control all input and output data for the culling test, wherein the second input terminal of said first multiplexer receiving the output data from said adder, the second input terminal of said second multiplexer receiving the output data from said adder, and if the final output data of said adder being greater than zero, the plane tested is visible, otherwise, the plane tested is invisible.

3. The culling apparatus of claim 2, wherein the multiplier and adder are with pipeline structures.

* * * * *